(12) United States Patent
Chen

(10) Patent No.: US 6,327,524 B1
(45) Date of Patent: Dec. 4, 2001

(54) SYSTEM FOR HIGH EFFICIENCY MOTOR CONTROL

(75) Inventor: Li Chen, Livonia, MI (US)

(73) Assignee: Ford Global Technologies, Inc.

( * ) Notice: Subject to any disclaimer, the term of this patent is extended or adjusted under 35 U.S.C. 154(b) by 0 days.

(21) Appl. No.: 09/561,546

(22) Filed: Apr. 28, 2000

(51) Int. Cl.⁷ .................. G06F 17/00; G06F 7/00
(52) U.S. Cl. .................. 701/22; 701/84; 318/825; 318/826
(58) Field of Search .................. 701/22, 83, 90, 701/84; 180/443; 318/800, 806, 807, 825, 826, 827

(56) References Cited

U.S. PATENT DOCUMENTS

| | | |
|---|---|---|
| 4,023,083 | 5/1977 | Plunkett . |
| 4,777,422 | 10/1988 | Slicker et al. . |
| 5,003,243 | 3/1991 | Tadakuma et al. . |
| 5,334,923 * | 8/1994 | Lorenz et al. ............ 318/805 |
| 5,585,709 * | 12/1996 | Jansen et al. ............ 318/807 |
| 5,612,605 * | 3/1997 | Tao ......................... 318/805 |
| 5,650,700 | 7/1997 | Mutoh et al. . |
| 5,659,235 | 8/1997 | Yamada et al. . |
| 5,740,880 * | 4/1998 | Miller ...................... 180/446 |
| 5,814,967 | 9/1998 | Garces et al. . |

* cited by examiner

*Primary Examiner*—William A. Cuchlinski, Jr.
*Assistant Examiner*—Gertrude Arthur
(74) *Attorney, Agent, or Firm*—Mark S. Sparschu

(57) ABSTRACT

A device for high efficiency motor control includes an induction motor and a controller. The induction motor generates a motor torque and has a given rotor resistance and magnetizing inductance at a specific temperature. The controller is coupled to and controls the induction motor. The controller includes control logic operative to maximize the motor torque using a flux current and a torque current. The controller determines the flux current and torque current based upon a requested torque, a requested speed, the magnetizing inductance, the temperature and the rotor resistance.

22 Claims, 1 Drawing Sheet

SYSTEM FOR HIGH EFFICIENCY MOTOR CONTROL

TECHNICAL FIELD

The present invention relates generally to electric machine control and, more particularly, to a system for high efficiency motor control.

BACKGROUND ART

Automotive emissions have a negative impact on the Earth's environment. In an effort to reduce the effect of automotive emissions on the environment, extensive legislation has been passed to regulate the amount and types of emissions allowed for automobiles. As time has progressed, government regulations regarding the amount and types of emissions allowed has continued to become more strict. As a result, the automotive industry has continually explored technology to assist in emissions reduction. One possible technology being explored is hybrid or completely electric vehicles. These electric vehicles require the use of an electric motor as a power source.

Industrial applications such as electric vehicles, robotics, automated machine tools and precise positioning systems are generally implemented with DC-servo motors as power sources. DC motors are commonly used for applications requiring characteristics such as fast response and good low speed control because the torque developed by a DC motor is proportional to the armature current. The armature current of a DC motor is easily controlled using current feedback. Although the AC induction motor enjoys a number of advantages such as higher output per unit mass over the DC motor, the fact that rotor flux is induced rather than directly controlled has traditionally disqualified the AC induction motor from many high performance, high precision industrial applications.

The recent development of field-oriented control has now made fast torque control of induction motors achievable. Analogous to the DC machine, the torque control of an AC motor will be achieved through current control, however, in the AC case this must also include the phase as well as the amplitude.

In a DC motor the commutator and the brushes fix the orientation of the field flux and the armature mmf. However, in an AC machine, the orientation of the field flux and armature mmf must be controlled externally. If this orientation is not controlled in the AC motor then the angles between the various fields vary with loads and transients making for an oscillatory dynamic response. With the orientation between the fields controlled externally in the AC motor, current feedback can be applied to allow torque control.

Various approaches have been made to qualify the induction motor for high performance applications using various concepts of field oriented control. One approach involves the measurement of rotor flux and the determination of stator terminal excitation values needed to produce desired torque or speed conditions.

Also, overall drive system efficiency has not been an important issue until the advent of the electric vehicle. This is particularly important on electric vehicles because the range and acceleration of an electric vehicle is limited by its battery capacity.

The disadvantages associated with conventional motor control have made it apparent that a new technique for high efficiency motor control is needed. Preferably, the new technique should maximize motor torque and efficiency. The present invention is directed to these ends.

SUMMARY OF THE INVENTION

It is an object of the invention to provide an improved and reliable means for high efficiency motor control. Another object of the invention is to maximize motor torque.

A device for high efficiency motor control includes an induction motor and a controller. The induction motor generates a motor torque and has a given rotor resistance and magnetizing inductance at a specific temperature. The controller is coupled to and controls the induction motor. The controller includes control logic operative to maximize the motor torque using a flux current and a torque current. The controller determines the flux current and torque current based upon a requested torque, a requested speed, the magnetizing inductance, the temperature and the rotor resistance.

The present invention achieves an improved and reliable means for a system for high efficiency motor control. Also, the present invention is advantageous in that it extends the useful range of electric vehicles.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

The following explanation directed toward FIGS. 1 and 2 of the drawings involves the use of numerous mathematic manipulations of various quantities, the symbols for which, for purposes of convenience, are introduced at this time in the following table:

TABLE 1

| | | |
|---|---|---|
| d | = | direct axis |
| q | = | quadrature axis |
| $v_{ds}$ | = | stator voltage in direct axis |
| $v_{qs}$ | = | stator voltage in quadrature axis |
| $r_s$ | = | stator resistance |
| $r_r$ | = | rotor resistance |
| $i_{ds}$ | = | stator current in direct axis |
| $i_{qs}$ | = | stator current in quadrature axis |
| $i_{dr}$ | = | rotor current in direct axis |
| $i_{qr}$ | = | rotor current in quadrature axis |
| P | = | differential operator (i.e., px = dx/dt) |
| $\omega_s$ | = | fundamental excitation frequency |
| $\lambda_{qs}$ | = | stator flux in quadrature axis |
| $\lambda_{ds}$ | = | stator flux in direct axis |
| $\lambda_{qr}$ | = | rotor flux in quadrature axis |

TABLE 1-continued

| | | |
|---|---|---|
| $\lambda_{dr}$ | = | rotor flux in direct axis |
| $L_{ls}$ | = | leakage inductance for stator |
| $L_{lr}$ | = | leakage inductance for rotor |
| S | = | rotor slip |
| $S\omega_s$ | = | rotor slip frequency |
| p | = | number of poles of induction motor |

Figure 1:
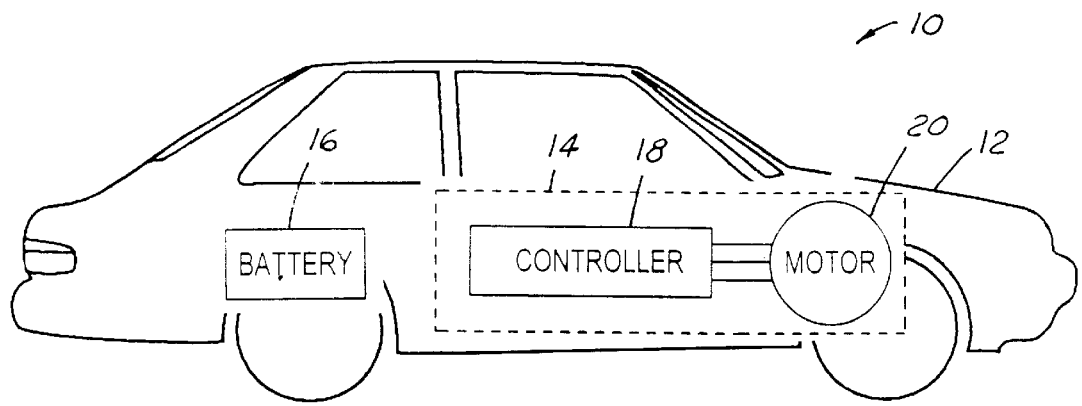
FIG. 1 is a block diagram of a vehicle system for high efficiency motor control according to a preferred embodiment of the present invention.

Referring to FIG. 1, a block diagram of a vehicle system 10 for high efficiency motor control according to a preferred embodiment of the present invention is illustrated. The vehicle system 10 includes a vehicle 12, a device for high efficiency motor control 14 and an energy source such as a battery 16. Device 14 is located in vehicle 12 and improves overall drive system efficiency by using flux current and torque current calculations based upon requested torque and speed. This allows the extension of the useful range and acceleration of vehicle 12. Battery 16 is located in vehicle 12 and provides energy for use in vehicle 12. Alternatively, the energy source can be a fuel cell or other energy source for supplying electricity to the vehicle. The vehicle 12 may also include an internal combustion engine operated on fossil fuel in cooperation with the electric motor described below.

The device for high efficiency motor control 14 includes a controller 18 and a motor 20. Controller 18 is located in vehicle 12 and controls motor 20 using a plurality of parameters. Motor 20 is located in vehicle 12 and supplies drive system locomotive power. Controller 18 is preferably microprocessor based.

It is well known that the voltage, flux, and current in the induction motor 20, being vector quantities reflecting their spatial relationships within the motor 20, can be completely described in a two dimensional coordinate system. For convenience, this representation is commonly used and the two axes of this coordinate system are commonly referred to as the "direct" or "d" axis and the quadrature or "q" axis. A full description of this can be found in "Simulation of Symmetrical Induction Machinery", P. C. Krause and C. H. Thomas, Transactions on Power Apparatus and Systems, vol. pas 5–84, No. 11, November 1965, incorporated herein by reference.

In order to express the vector quantities of the motor 20 in terms of d.c. quantities instead of sinusoidally varying AC values, it is customary to let the "d-q" coordinate system rotate at the stator frequency. This is referred to as the synchronously rotating coordinate system, in contrast to a stationary coordinate system.

The resulting d-q model equivalent voltage loop equations for this system are given as equations 1 to 4 below. The motor flux relationships, given by equations 5 to 8 can also be determined from the d-q model equivalent voltage loop equations for this system.

$$v_{ds}=r_s i_{ds}+p\lambda_{ds}-\omega_s\lambda_{qs} \tag{1}$$

$$v_{qs}=r_s i_{qs}+p\lambda_{qs}+\omega_s\lambda_{ds} \tag{2}$$

$$0=r_s i_{dr}+p\lambda_{dr}-S\omega_s\lambda_{qr} \tag{3}$$

$$0=r_s i_{qr}+p\lambda_{qr}+S\omega_s\lambda_{dr} \tag{4}$$

where $$\lambda_{ds}=L_{ls}i_{ds}+L_m(i_{ds}+i_{dr}) \tag{5}$$

$$\lambda_{qs}=L_{ls}i_{qs}+L_m(i_{qs}+i_{qr}) \tag{6}$$

$$\lambda_{dr}=L_{lr}i_{dr}+L_m(i_{ds}+i_{dr}) \tag{7}$$

$$\lambda_{qr}=L_{lr}i_{qr}+L_m(i_{qs}+i_{qr}) \tag{8}$$

and $L_{ls}$ and $L_{lr}$ are leakage inductance, while $L_m$ is magnetizing inductance.

Figure 2:
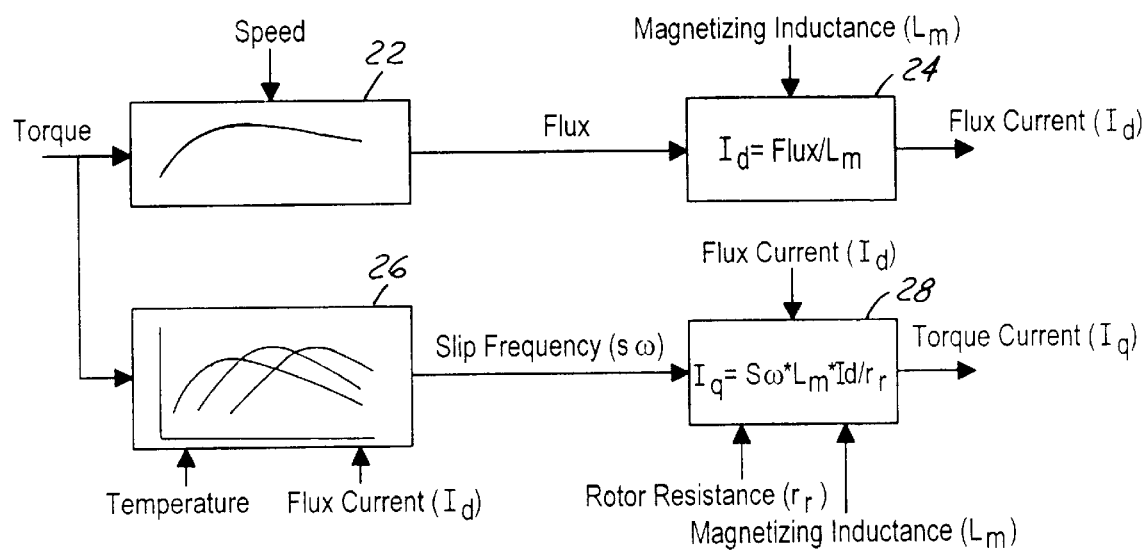
FIG. 2 is a flow diagram of a method for high efficiency motor control according to a preferred embodiment of the present invention.

Referring to FIG. 2, a flow diagram of a method for high efficiency motor control according to a preferred embodiment of the present invention is illustrated. In a software background loop, controller 18 uses a plurality of vehicle parameters to determine optimum flux current and torque current for a requested motor torque and speed. The sequence begins with step 22. For a given induction motor 20 and DC bus voltage, an optimal rotor flux level can generated when torque and speed are set. The optimal rotor flux level, for motor 20, is determined in step 22 for the requested motor torque and speed. Controller 18 may determine the optimal rotor flux level through the use of a look-up table or, preferably through dynamic calculation.

Referring back to step 22, after controller 18 determines the optimal rotor flux level, the sequence proceeds to step 24. In step 24, controller 18 uses equation (7) to determine flux current. During steady state, $i_{dr}=0$ and equation (7) becomes;

$$\lambda_{dr}=L_m i_{ds} \tag{9}$$

The vector control concepts imply that the rotor flux is entirely in the d-axis, resulting in;

$$\lambda_{qr}=0; \tag{10}$$

so, $$\lambda_r=\lambda_{dr} \tag{11}$$

and, $$i_{ds}=\lambda_{dr}/L_m \tag{12}$$

Therefore, controller 18 is able to calculate flux current based on optimal rotor flux level and magnetizing inductance.

Referring back to step 24, after controller 18 determines the flux current, the sequence proceeds to step 26. In step 26, controller 18 uses requested torque, temperature, and flux current to determine slip frequency. The torque can be expressed as:

$$\text{Torque}=(3/2)*(p/2)*(i^2 L_m^2 r_r S\omega_s/(r_r^2+(S\omega_s L_r)^2)) \tag{13}$$

for peak torque;

$$S\omega_s=r_r/L_r \tag{14}$$

It should be noted that the rotor resistance is varied with temperature, and rotor inductance may be saturated by flux current ($I_{ds}$). Therefore, the slip frequency ($S\omega_s$) is varied with temperature and flux current. Controller 18 may determine the slip frequency through dynamic calculation or, preferably, through the use of a look-up table.

Referring back to step 26, after controller 18 determines the slip frequency, the sequence proceeds to step 28. In step 28, controller 18 uses slip frequency, flux current, rotor resistance and magnetizing inductance to determine torque current. The vector control concepts imply that the rotor flux is entirely in the d-axis, resulting in:

$$\lambda_{qr}=0 \tag{15}$$

The d-q equations (4) and (8) for motor (20) become:

$$0 = r_r i_{qr} + S\omega_s \lambda_{dr})  \quad (16)$$

$$i_{qr} = -\frac{L_m}{L_r} i_{qs} \quad (17)$$

so, $$i_{qr} = S\omega_s \lambda_{dr}/r_r \quad (18)$$

since equation (9): $\lambda_{dr} = L_m i_{ds}$, then;

$$i_{qr} = S\omega_s L_m i_{ds}/r_r \quad (19)$$

combining equation (19) with equation (17) yields:

$$i_{qs} = S\omega_s L_r i_{ds}/r_r \quad (20)$$

The controller then uses both flux current and torque current to control motor 20.

The method and system of the present invention provides for maximum motor torque and efficiency for a given requested torque and speed. The present invention, therefore, improves range and acceleration of an electric vehicle for a given battery capacity.

From the foregoing, it can be seen that there has been brought to the art a new and improved system for high efficiency motor control. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A device for high efficiency motor control of a vehicle comprising:
    a vehicle drive motor having a rotor resistance and a magnetizing inductance, said motor producing a motor torque to propel said vehicle; and
    a controller coupled to and controlling said motor, said controller including control logic operative to maximize said motor torque using a flux current and a torque current, said controller determining said flux current and said torque current based upon a requested motor torque, a requested motor speed, said magnetizing inductance, a given temperature and said rotor resistance.

2. The device for high efficiency motor control as recited in claim 1, wherein said vehicle drive motor is an induction motor.

3. The device for high efficiency motor control as recited in claim 1, wherein said controller is microprocessor based.

4. The device for high efficiency motor control as recited in claim 1, wherein said controller determines said flux current based upon an optimal rotor flux level and said magnetizing inductance.

5. The device for high efficiency motor control as recited in claim 4, wherein said controller uses a dynamic calculation to determine said optimal rotor flux level based upon said requested motor torque and said requested motor speed.

6. The device for high efficiency motor control as recited in claim 4, wherein said controller uses a look-up table to determine said optimal rotor flux level based upon said requested motor torque and said requested motor speed.

7. The device for high efficiency motor control as recited in claim 1, wherein said controller determines torque current based upon a slip frequency, said flux current, said rotor resistance and said magnetizing inductance.

8. The device for high efficiency motor control as recited in claim 7, wherein said controller uses a dynamic calculation to determine said slip frequency based upon said requested motor torque, said temperature, and said flux current.

9. The device for high efficiency motor control as recited in claim 7, wherein said controller uses a look-up table to determine said slip frequency based upon said requested motor torque, said temperature, and said flux current.

10. A vehicle system for high efficiency motor control comprising:
    a vehicle;
    an energy source located in said vehicle for supplying energy for use in said vehicle;
    a device for high efficiency motor control located in said vehicle comprising:
        a vehicle drive induction motor having a rotor resistance and a magnetizing inductance, said motor producing a motor torque for propelling said vehicle; and a microprocessor-based controller coupled to and controlling said motor, said controller including control logic operative to maximize said motor torque using a flux current and a torque current, said controller determining said flux current and said torque current based upon a requested motor torque, a requested motor speed, said magnetizing inductance, a given temperature and said rotor resistance.

11. The vehicle system for high efficiency motor control as recited in claim 10, wherein said controller determines said flux current based upon an optimal rotor flux level and said magnetizing inductance.

12. The vehicle system for high efficiency motor control as recited in claim 11, wherein said controller uses a dynamic calculating to determine said optimal rotor flux level based upon said requested motor torque and said requested motor speed.

13. The vehicle system for high efficiency motor control as recited in claim 11, wherein said controller uses a look-up table to determine said optimal rotor flux level based upon said requested motor torque and said requested motor speed.

14. The vehicle system for high efficiency motor control as recited in claim 10, wherein said controller determines said torque current based upon a slip frequency, said flux current, said rotor resistance and said magnetizing inductance.

15. The vehicle system for high efficiency motor control as recited in claim 14, wherein said controller use a dynamic calculation to determine said slip frequency based upon said requested motor torque, said temperature, and said flux current.

16. The vehicle system for high efficiency motor control as recited in claim 14, wherein said controller uses a look-up table to determine said slip frequency based upon said requested motor torque, said temperature, and said flux current.

17. The vehicle system for high efficiency motor control as recited in claim 10, wherein the energy source is a battery.

18. The vehicle system for high efficiency motor control as recited in claim 10, wherein the energy source is a fuel cell.

19. A method of high efficiency induction motor control for an electric vehicle driven by an induction motor, the induction motor having a rotor resistance and a magnetizing inductance at a temperature and producing a motor torque, said method comprising the steps of:

determining an optimal rotor flux based upon a requested motor torque and a requested motor speed;

determining a flux current based upon said magnetizing inductance and said optimal rotor flux;

determining a slip frequency based upon said requested motor torque, said flux current, and said temperature;

determining a torque current based upon said slip frequency, said flux current, said rotor resistance, and said magnetizing inductance; and controlling said induction motor based upon said flux current and said torque current to maximize motor torque.

20. The method of high efficiency induction motor control as recited in claim 19, wherein the step of determining an optimal rotor flux comprises dynamically calculating said optimal rotor flux based upon said requested motor torque and said requested motor speed.

21. The method of high efficiency induction motor control as recited in claim 19, wherein the step of determining a slip frequency comprises dynamically calculating said slip frequency based upon said requested motor torque and said temperature.

22. The method of high efficiency induction motor control as recited in claim 19, wherein the step of determining a slip frequency comprises referencing a look-up table for said slip frequency based upon said requested motor torque and said temperature.

* * * * *